Nov. 27, 1934.  W. A. JONES  1,981,865
WATER TUBE BOILER
Filed Oct. 15, 1929  4 Sheets-Sheet 1
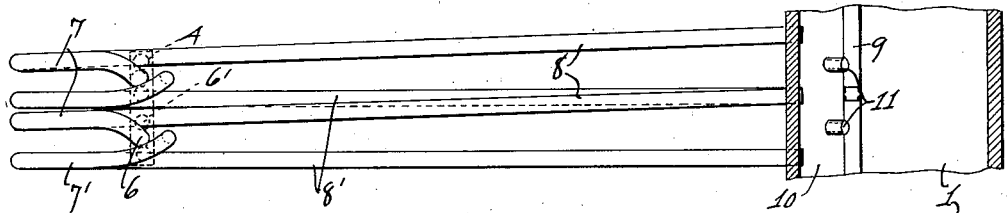
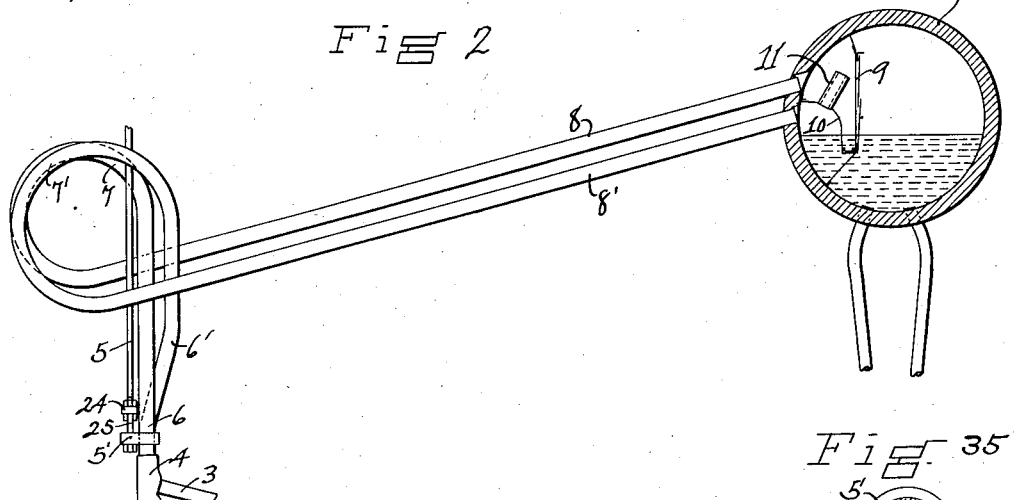
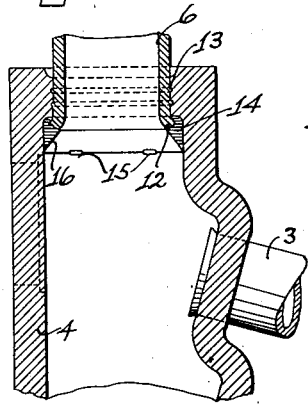
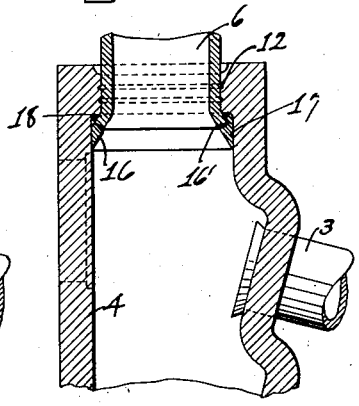
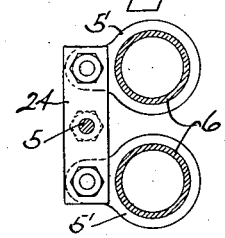
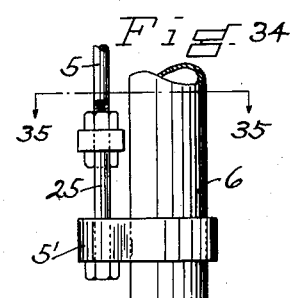
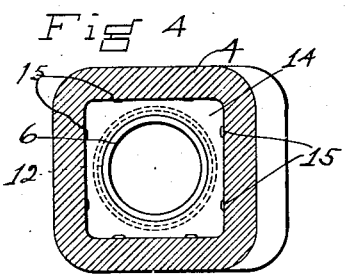
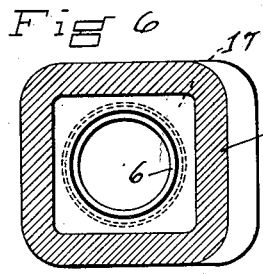
INVENTOR
William A. Jones
BY
Gifford, Scull & Burgess
ATTORNEYS Nov. 27, 1934.  W. A. JONES  1,981,865
WATER TUBE BOILER
Filed Oct. 15, 1929  4 Sheets-Sheet 2
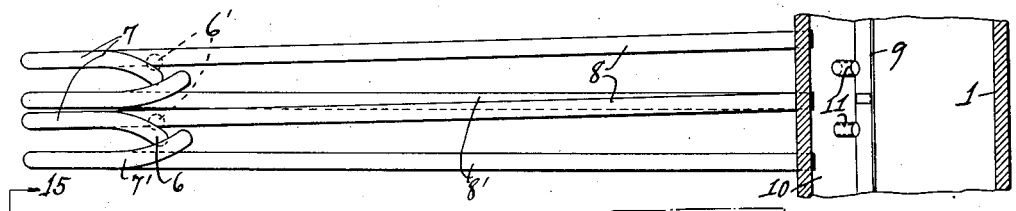
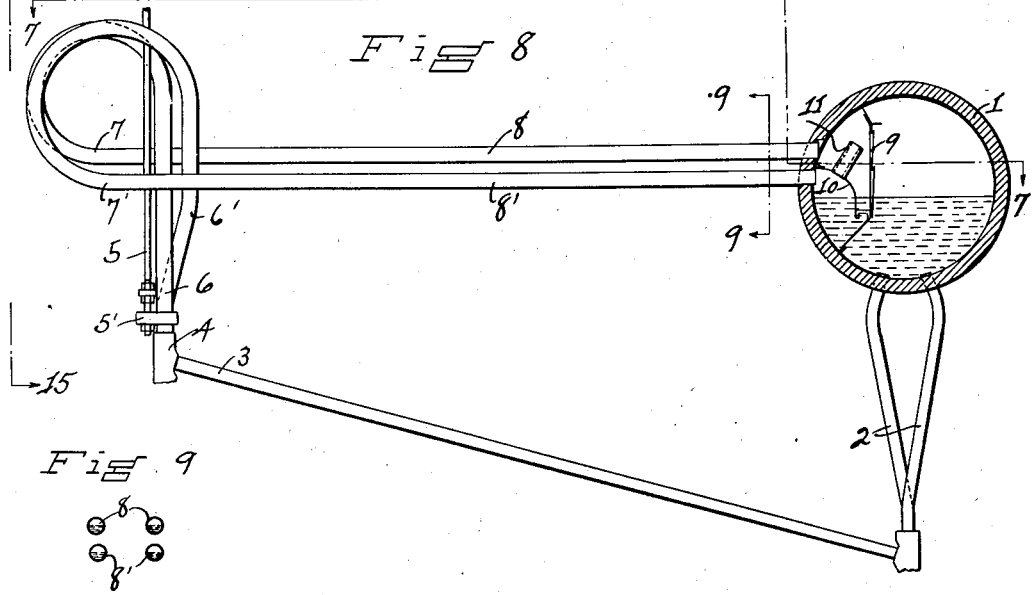
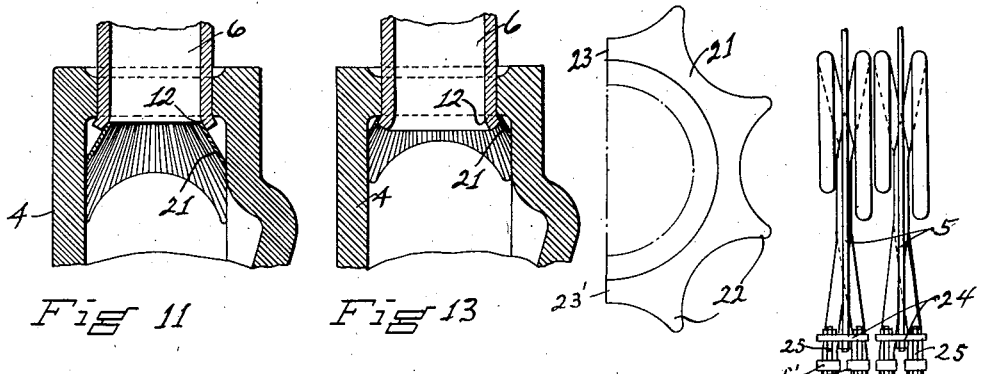
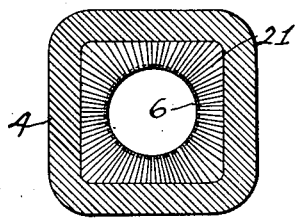
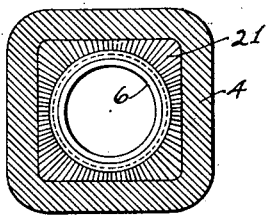
INVENTOR
William A. Jones
BY
Gifford, Scull & Burgess
ATTORNEYS

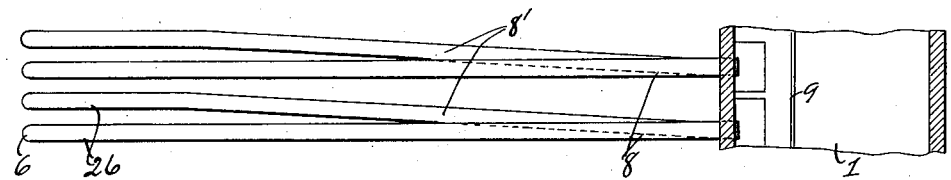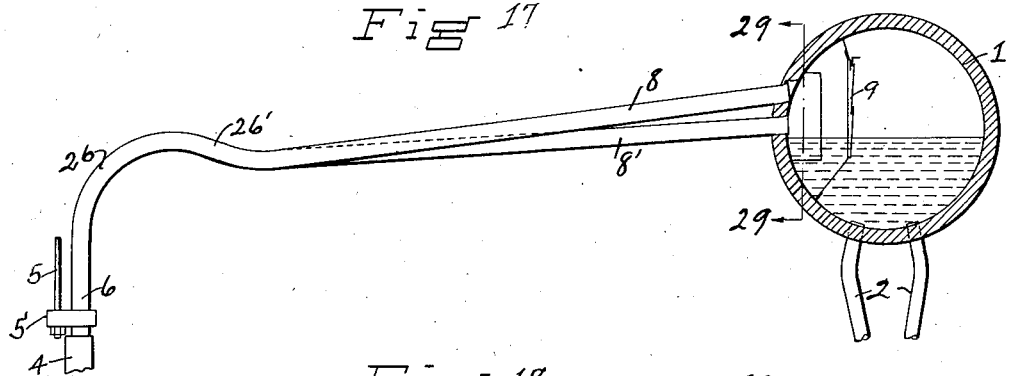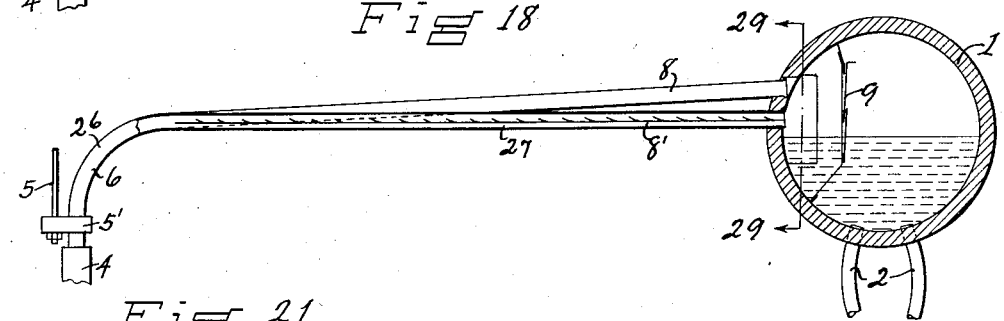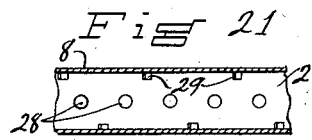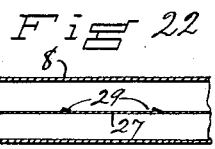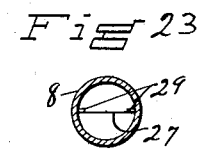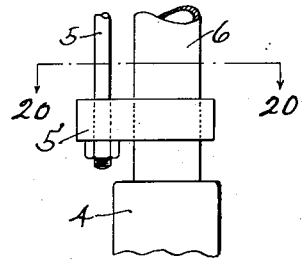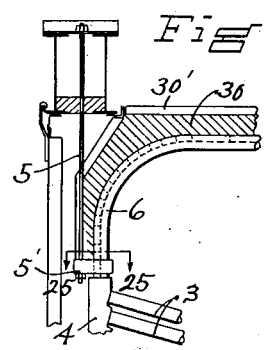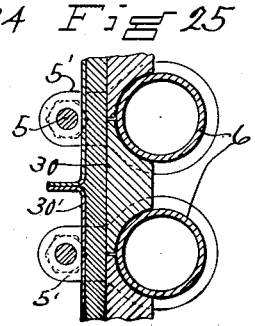

Nov. 27, 1934.  W. A. JONES  1,981,865
WATER TUBE BOILER
Filed Oct. 15, 1929  4 Sheets-Sheet 4
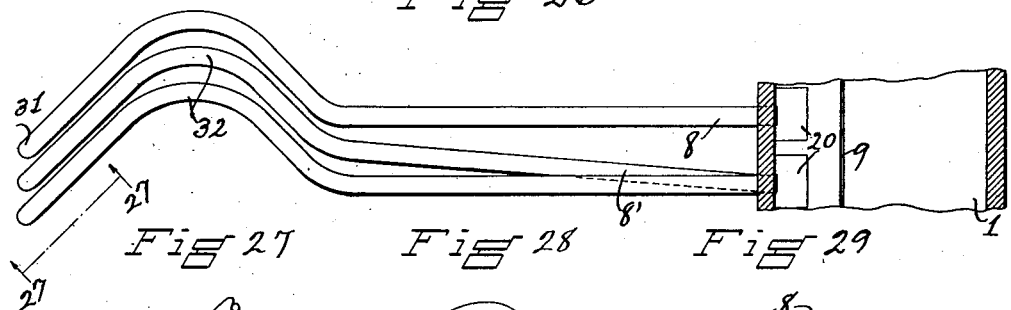
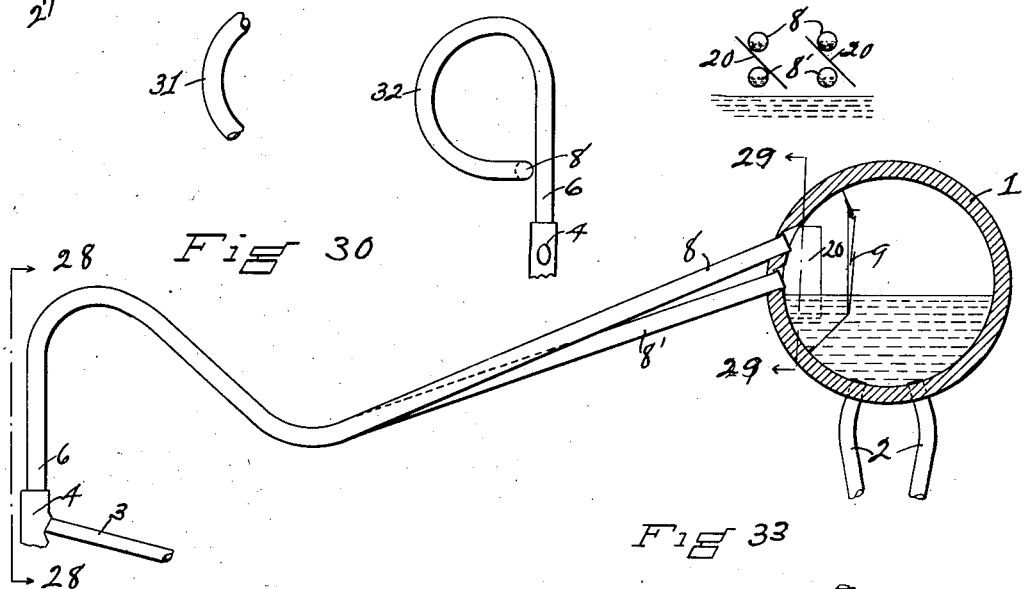
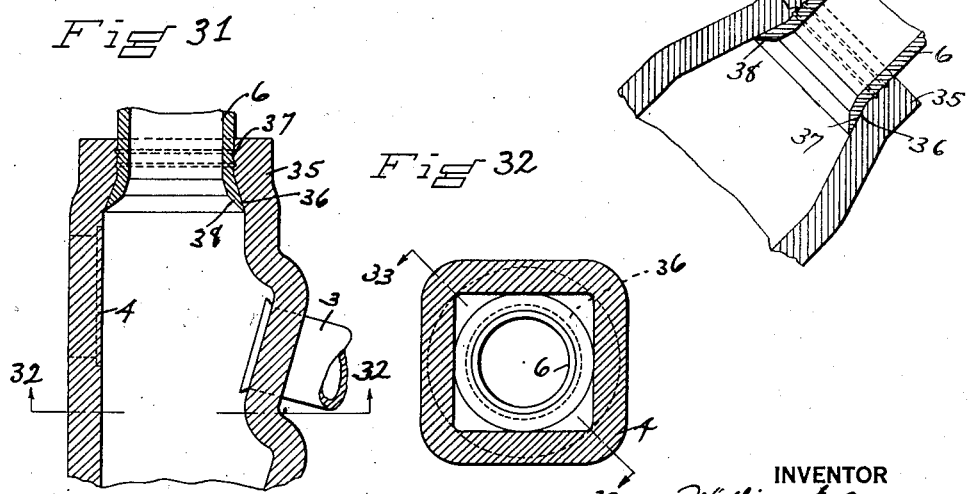
INVENTOR
William A. Jones
BY
Gifford, Scull Burgess
ATTORNEYS Patented Nov. 27, 1934

1,981,865

UNITED STATES PATENT OFFICE 1,981,865

WATER TUBE BOILER

William A. Jones, Westerleigh, N. Y., assignor to The Babcock & Wilcox Company, Bayonne, N. J., a corporation of New Jersey Application October 15, 1929, Serial No. 399,752

24 Claims. (Cl. 122—488)

This invention relates to a water tube boiler that is provided with uptake and downtake headers connected by inclined tubes. The downtake headers are connected to a steam and water drum by nipples. Circulating tubes connect the upper ends of the uptake headers to the steam and water drum in such a manner that the mixture of steam and water flows freely from the upper ends of the headers into the circulating tubes. The circulating tubes aid in separating the steam and water before they enter the steam and water drum.

The invention will be understood from the description in connection with the accompanying drawings in which Fig. 1 is a plan view partly broken away and partly in section showing some of the tubes connecting the upper headers and the steam and water drum; Fig. 2 is a side view of the same; Fig. 3 is a vertical section through an illustrative embodiment of the upper end of one of the uptake headers; Fig. 4 is a section at right angles to Fig. 3; Fig. 5 is a section similar to Fig. 3 showing a modification; Fig. 6 is a section at right angles to Fig. 5; Fig. 7 is a plan view similar to Fig. 1 showing a modification taken along the line 7—7 of Fig. 8; Fig. 8 is a side view of Fig. 7; Fig. 9 is a section along the line 9—9 of Fig. 8; Fig. 10 is a section similar to Fig. 5 showing another modification; Fig. 11 is a section at right angles to Fig. 10; Fig. 12 is a section similar to Fig. 3 showing another modification; Fig. 13 is a section at right angles to Fig. 12; Fig. 14 is a plan view showing a development of a piece of sheet metal for one of the details; Fig. 15 is a front view taken along the line 15—15 of Fig. 8; Fig. 16 is a view similar to Fig. 1 showing another modification; Fig. 17 is a view at right angles to Fig. 16; Fig. 18 is a view similar to Fig. 17 showing partly in section another modification; Fig. 19 is a side view partly broken away showing how the sections are supported at the uptake end; Fig. 20 is a section along the line 20—20 of Fig. 19; Fig. 21 is a longitudinal horizontal section through one of the tubes partly broken away; Fig. 22 is a vertical longitudinal section at right angles to Fig. 21; Fig. 23 is a cross section at right angles to Fig. 21 or Fig. 22; Fig. 24 is a sectional view partly broken away showing some of the details; Fig. 25 is a section along the line 25—25 of Fig. 24; Fig. 26 is a view similar to Fig. 1 showing another modification with the tubes bent to form a helix; Fig. 27 is a view partly broken away taken along the line 27—27 of Fig. 26; Fig. 28 is an end view showing the helix; Fig. 29 is a section along the line 29—29 of Figs. 17, 18 or 30 showing an arrangement of inclined baffles which may be used instead of the curved inner baffle and nipples of Figs. 2 and 8; Fig. 30 is a side view similar to Fig. 2 showing a side view of Fig. 26; Fig. 31 is a section similar to Fig. 3 showing another modification; Fig. 32 is a section along the line 32—32 of Fig. 31; Fig. 33 is a section along the line 33—33 of Fig. 32; and Figs. 34 and 35 are views similar to Figs. 19 and 20 showing another way of supporting the sections.

In the drawings, reference character 1 indicates a steam and water drum, the water space of which is connected by nipples 2 to downtake headers in the usual manner. Tubes 3 connect the downtake headers to uptake headers 4 to form sections that are supported from a support outside of the boiler setting by means of straps or rods 5 that are connected to collars or lugs 5' on the circulating tubes 6 near the upper ends of the headers 4.

The circulating tubes 6 extend from the upper ends of the headers 4 to the steam space of the steam and water drum 1. The odd numbered tubes beginning at one side are designated by the reference character 6 and the even numbered tubes by the reference character 6'. In the modification shown in Fig. 1 the circulating tubes 6 and 6' are bent into loops 7 and 7' a short distance above the upper ends of the headers 4, these loops being approximately in the same vertical planes as the respective tubes, with the loops 7 of the odd numbered tubes 6 smaller than the loops 7' of the even numbered tubes 6', thus providing extending portions 8 and 8' of the respective tubes in two rows occupying planes one slightly above the other so that the tubes enter the steam and water drum 1 along two horizontal rows of holes one above the other.

The steam and water drum 1 is provided with baffles 9 and 10. The baffle 9 extends from a line above the ends of the tubes 8 to a distance below the normal water level in the drum, and the curved baffle 10 extends from a line between the rows of tubes 8 and 8' to a distance below the normal water level. A series of nipples 11 extend through the baffle 10 to permit the steam below the baffle 10 to pass upwardly without becoming mixed with water discharged from the upper tubes. These nipples are sufficiently long to prevent any appreciable amount of water that enters the drum through the tubes 8 from passing downwardly through the nipples 11.

It is desirable to provide connections between the headers 4 and the drum 1 so that the mixture of steam and water from the headers to the drum will meet as little resistance to flow as possible. In this way the flow of water through the tubes 3 connecting the downtake headers to the uptake headers is permitted to take place in the desired manner. For the purpose of decreasing the resistance to flow holes are provided in the upper ends of the headers 4 into which holes the tubes 6 are expanded. The lower ends of the tubes 6 are expanded outwardly (Figs. 3 and 4) as indicated at 12 and the holes 13 or tube seats in the upper ends of the headers 4 may be provided with expanding grooves of the well known sort. A filler 14 of heat resisting material may be located on the inside of the upper end of each header 4 surrounding the expanded ends 12 of the tubes 6. These fillers may be kept in position by welded teats 15 and are provided with inside conically shaped surfaces 16, thus giving smooth approaches from the headers 4 into the tubes 6 without any abrupt turns or corners.

In the modification shown in Figs. 5 and 6 a metallic bushing 17 is welded as shown at 18 into the upper end of each header 4 and is provided with a conical surface 16 and a recess 16'. The bushings 17 are preferably put in place and welded before the tubes 6 are expanded in the seats 13 and the tube ends expanded into the recesses 16'. The surfaces may be machined, if desired. The conically shaped surfaces which give smooth approaches into the tubes 6 decrease the resistance to flow.

In the illustrative embodiment of the arrangement of the circulating tubes between the headers 4 and the drum 1, as shown in Figs. 1 and 2 the drum is at such a level that the loop portions of the bent circulators may be submerged and the portions 8 and 8' of the circulating tubes from the loops to the drum incline upwardly toward the drum.

In the modification shown in Figs. 7 and 8 the portions 8 and 8' of the circulating tubes from the loops 7 and 7' to the drum 1 are shown as being horizontal. In both embodiments of the invention the mixture of steam and water passing through the loops 7 and 7' will be separated by centrifugal force so that the water will flow along the lower sides of the portions 8 and 8' of the tubes as shown in Fig. 9, so that the steam and water will be separated to a considerable extent before they enter the drum 1.

In the modification shown in Figs. 10 and 11 a templet 21 of thin metal is placed in the upper end of each header 4 to provide a smooth conical approach from the header to the tube 6.

The modification in Figs. 12 and 13 differs slightly from that in Figs. 10 and 11 by having the templet 21 to extend around the outside of the expanded end 12 of the tube 6 instead of extending into the inside of the tube as shown in Fig. 10. The area of passage for the steam and water in Fig. 10 will be slightly less than that in Fig. 12, but the exposed end of the tube 6 in Fig. 12 will have a tendency to set up eddies that may interfere with the free passage of the steam and water. The templet 21 is shown in Fig. 14 as cut from a sheet of metal which when bent into a cone will have its edges 23, 23' in contact with each other with the points 22 extending into the corners of the header 4 to provide a smooth conical surface from the header 4 into the tube 6.

The manner in which the headers 4 are supported is shown more in detail in Figs. 15, 34 and 35. The rods or straps 5 pass through holes near the middle of cross pieces 24 from the ends of which rods 25 are connected to the collars or lugs 5' into which the tubes 6 may be expanded or otherwise secured, as for example by welding. Each rod 5 supports two headers 4 in this manner. In the modification shown in Figs. 19 and 20, each rod 5 is connected to a collar 5' on a tube 6.

In the modification shown in Figs. 16 and 17 the loops are omitted from the circulating tubes 6, but the tubes are bent along an arc of a circle as shown at 26, and then along a reverse bend 26', to provide centrifugal force to throw the water down from the top to the bottom of each tube. The portions 8 and 8' of the tubes are disposed so as to have them enter the steam and water drum 1 along two horizontal rows with the entering end of a tube in one row below that of a tube in the other row.

In the modification shown in Fig. 18 the bend 26 extends through a smaller angle than that shown in Fig. 17, and the reverse bend 26' is omitted, the two modifications being otherwise similar.

The portions 8 and 8' of the circulating tubes may be provided with plates 27 extending longitudinally of the tubes and occupying a horizontally diametrical position in the tubes from one side thereof to the other. Holes 28 may be provided in the plates 27 to permit steam to pass to the upper sides, and tongues 29 are struck up along the edges of the plates 27 leaving corresponding openings. The tongues extend in directions opposite that of the flow of the fluid through the tubes so that water is caused to pass below the plates 27 and flow along the lower sides of the portions 8 or 8' of the tubes.

A roof 30 may be provided above the circulating tubes as indicated in Fig. 24. The roof 30 may be extended around the circulating tubes down to the upper ends of the header 4. The casing is indicated at 30'.

In the modification shown in Figs. 26 to 30, the tubes connecting the upper ends of the headers to the steam and water drum 1 have portions in the form of helices so that by centrifugal force the water will be thrown to the outer side of the helices and thus separated from the steam, similar to the way water is separated from steam by the bends shown in Figs. 7 and 8.

In this modification the circulating tubes are turned at approximately 90° (Fig. 27) a short distance above the headers 4, as shown at 31, beyond which place they extend in the form of helices to the portions 8 and 8' and enter the drum 1 in two rows.

Instead of having the curved inner baffle 10 and nipples 11 in the drum 1 as shown in Figs. 1 and 2, for example, a short inclined plate 20 (Figs. 26, 29 and 30) may be placed in the drum at the end of each pair of tubes 8 and 8' in such a position that the water from an upper tube 8 will flow along the top side of the plate 20 to the water space in the steam and water drum and the steam from the upper portion of the lower tube 8 will pass upwardly along the lower side of the plate 20 without commingling with the water from the upper tubes 8. The different embodiments of the invention indicated in Figs. 1, 2, 26 and 29 are exemplifications of separating means which promote steam and water separation within the drum. In these modifications steam guiding surfaces are presented for so directing steam from the circulators that it does not come in initial contact with water discharged from adjacent circulators. The particular means for forming these surfaces may be termed "baffles".

Instead of providing templets or fillers in the headers 4 at the ends of the tubes 6, as above described, to obtain a smooth approach for the fluids, the upper ends of the headers 4 may be drawn into circular shape as indicated at 35 with a conical inside surface 36 (Figs. 31 to 33). The tubes 6 are expanded into the holes or tube seats 37 in the ends of the rounded portions 35. The expanded ends of the tubes are caused to flare outwardly and fit the conical portions 36 in the headers 4 and the insides of the ends are machined as shown at 38 to provide a conical approach into the tubes 6 and obviate sharp corners or edges that would cause resistance to the passage of the fluids.

I claim:

1. In a water tube boiler, a steam and water drum, uptake headers, and tube connections from said steam and water drum to said headers, said tube connections being provided with curved portions extending through more than 180° to separate water from steam passing therethrough.

2. In a water tube boiler, a steam and water drum, uptake headers, and tube connections from said steam and water drum to said headers, said tube connections being provided with loops of more than 180° to separate water from steam passing therethrough.

3. In a water tube boiler, a steam and water drum, uptake headers, and tube connections from said steam and water drum to said headers, said tube connections being provided with substantially vertical loops of more than 180° to separate water from steam passing therethrough.

4. In a water tube boiler, a steam and water drum, uptake headers, and tube connections from said steam and water drum to said headers, said tube connections being provided with loops exceeding 180° of different sizes to separate water from steam passing therethrough.

5. In a water tube boiler, a steam and water drum, uptake headers, means for supporting said headers outside of said boiler, and tube connections from said steam and water drum entering the upper ends of said headers, said means being attached to said tube connections.

6. In a water tube boiler, a steam and water drum, uptake headers, tubes connecting said headers to said drum, and plates in said tubes having means to cause water to pass to one side of said plates, said plates being also provided with openings permitting steam to pass to the other side thereof.

7. In a water tube boiler, a steam and water drum, uptake headers, and tube connections each leading directly from the upper ends of upstake headers so that the direction of the steam and water entering these tubes is the same as that in the upper portions of said headers, said tubes being provided with curves exceeding 180° to separate steam and water passing therethrough.

8. In a water tube steam boiler, a steam and water drum, a bank of steam generating tubes having communication with the water space of the drum, separate circulators having communication with the steam generating tubes and discharging steam and water into the drum above its water level, and means including a plate fixed within the drum between the discharge ends of the circulators and so arranged as to direct water discharging from one circulator out of the path of the discharge of an adjacent circulator, said plate having a part extending upwardly past the discharge of an upper circulator to permit steam from a lower circulator to proceed directly to the upper part of the drum without interference by the discharge from the upper circulator.

9. A steam boiler of the cross-drum type comprising, in combination, a steam and water drum, horizontally inclined steam generating tubes, a downtake connecting the drum and the tubes, circulators receiving a mixture of steam and water discharged from the generating tubes and extending horizontally to the drum, connections between the circulators and the generating tubes and separators fixed within the circulators and extending longitudinally thereof throughout substantial parts of their lengths to increase the steam and water separation effected within the circulators.

10. In fluid heat exchange apparatus, a gas and liquid separation chamber, upper and lower rows of tubes connected to the chamber so as to have outlets in its gas space and discharging gas and liquid into the chamber, means connecting said tubes and the chamber into a fluid circulation system, and independent baffles spaced from each other along a wall of the chamber and located between successive outlets longitudinally of the chamber to maintain their discharges free from interference with each other, the water from each of said outlets and the steam from each of said outlets being free to separately and directly move to different positions within the chamber, said baffles presenting steam guiding surfaces extending in a direction transversely of the chamber.

11. In fluid heat exchange apparatus, a gas and liquid separation chamber, rows of tubes connected to the chamber so as to have outlets in its gas space at different levels and discharging gas and liquid into the chamber, means connecting said tubes and the chamber into a fluid circulation system, and a row of spaced and independent baffles fixed to the chamber with each baffle arranged between successive outlets longitudinally of the chamber to maintain their discharges free from interference with each other, the waters from each of said outlets and the steam from each of said outlets being free to separately and directly move to their respective supplies within the chamber, said baffles presenting steam guiding surfaces extending in a direction transversely of the chamber.

12. In fluid heat exchange apparatus, a gas and liquid separation chamber, rows of tubes connected to the chamber so as to have outlets in its gas space at different levels and discharging gas and liquid into the chamber, means connecting said tubes and the chamber into a fluid circulation system, and separators in the form of parallel oblique plates each fixed in position transversely of the chamber between successive outlets to maintain their discharges free from interference with each other, the waters from each of said outlets and the steam from each of said outlets being free to separately and directly move to their respective supplies within the chamber, said baffles presenting steam guiding surfaces extending in a direction transversely of the chamber.

13. In fluid heat exchange apparatus, a drum for collecting a gas in one portion and a liquid in another, a row of tubes connected to the drum and discharging gas and liquid into the drum, and separators fixed longitudinally in the tubes to promote separation of the gas and the liquid prior to their discharge into the drum, the separators presenting openings permitting gas to move from the lower parts of the tubes toward their upper parts.

14. In fluid heat exchange apparatus a drum for collecting a gas in one portion and a liquid in another, a row of tubes connected to gas space of the drum and discharging gas and liquid into the drum, and separators fixed longitudinally of the tubes to promote separation of the gas and the liquid prior to their discharge into the drum, the separators having oblique deflector parts fixed in relation thereto to cause water to pass to the lower parts of the tubes.

15. In fluid heat exchange apparatus, a drum for collecting a gas in one portion and a liquid in another, a row of tubes connected to the drum and discharging gas and liquid into the drum, and separators fixed longitudinally within the tubes to promote separation of the gas and the liquid prior to their discharge into the drum, the separators being substantially horizontally arranged and provided with openings permitting the gas to rise to the upper parts of the tubes while the liquid moving along each tube in the same direction as the gas tends to flow to the lower parts of the tubes.

16. In a water tube steam boiler, a bank of inclined steam generating tubes extending across a gas pass, a steam and water drum, downtake connections between the water space of the drum and the intake ends of the generating tubes, circulators connected to the drum and discharging steam and water therein, connections between the discharge ends of the generating tubes and the circulators, and separators arranged longitudinally of the circulators and having spaced oblique parts causing water to move toward the lower parts of the circulators, the separators being also formed with openings permitting steam to rise to the upper parts of the circulators.

17. In a water tube steam boiler, a bank of inclined steam generating tubes extending across a gas pass, a steam and water drum, downtake connections between the water space of the drum and the intake ends of the generating tubes, circulators connected to the drum and discharging steam and water therein, connections between the discharge ends of the generating tubes and the circulators, and separators within the circulators for promoting steam and water separation, said separators being formed as apertured plates extending substantially horizontally transversely of the circulators and provided with deflectors to cause the water to flow from the top portions to the bottom portions of the tubes.

18. In a water tube steam boiler, a bank of inclined steam generating tubes extending across a gas pass, a steam and water drum, downtake connections between the water space of the drum and the intake ends of the generating tubes, circulators connected to the drum and discharging steam and water therein, connections between the discharge ends of the generating tubes and the circulators, and separators fixed to and extending longitudinally within the circulators for promoting steam and water separation, the separators extending in cross section substantially horizontally transversely of the circulators and being formed to provide openings for steam to move toward the upper parts of the circulators.

19. In a water tube steam boiler, a bank of inclined steam generating tubes extending across a gas pass, a steam and water drum, downtake connections between the water space of the drum and the intake ends of the generating tubes, circulators connected to the drum and discharging steam and water therein, connections between the discharge ends of the generating tubes and the circulators, and separators within the circulators for promoting steam and water separation, said separators extending longitudinally of the circulators and constituting apertured plates which divide the circulators into upper steam passages and lower water passages.

20. In a steam boiler having a bank of steam generating tubes, vertical uptake headers having vertically spaced openings in one side thereof receiving corresponding ends of said tubes, a steam and water drum, and circulators of substantial length extending from said drum and having their lower ends expanded into the upper ends of said uptake headers, the improvement which comprises a downwardly tapering ring-shaped member having a smooth inner surface extending between the expanded end of each circulator and the inner wall surfaces of the corresponding header above said tube connections and providing a smooth flow path between the upper end of each header and the corresponding circulator.

21. In fluid heat exchange apparatus, a vapor and liquid chamber, vapor generating tubes, means connecting the liquid space of the chamber to the inlet ends of said tubes, circulators receiving vapor and liquid from the tubes and having their discharge ends connected to the chamber at a plurality of levels, and spaced baffles fixed within the chamber and arranged so as to form separate vapor passages leading upwardly from the discharge ends of the lower circulators, and barriers in the path of liquid flowing down from the discharge ends of the upper circulators to thereby prevent said liquid from contacting with vapor simultaneously passing upwardly from the lower circulators.

22. In a water tube boiler, a steam and water drum, uptake headers, tube connections from a plurality of rows of holes along said steam and water drum entering the upper ends of said headers in alignment with said ends, means including a bank of vapor generating tubes joining the drum and headers with their connections in a fluid circulation system, and steam and water baffles in said steam and water drum interposed between said rows of holes, the baffles having upwardly extending steam guiding means directing the steam so that it may collect in the upper part of the drum without interference by the discharge from an upper row of holes.

23. In a water tube boiler, a steam and water drum, uptake headers, tube connections from a plurality of rows of holes along said steam and water drum entering the upper ends of said headers in alignment with said ends, means including a bank of vapor generating tubes joining the drum and headers with their connections in a fluid circulation system, and steam and water baffles comprising inclined plates fixed in said steam and water drum and interposed between said rows of holes, the baffles having upwardly extending steam guiding means directing the steam so that it may collect in the upper part of the drum without interference by the discharge from an upper row of holes.

24. In fluid heat exchange apparatus, a gas and liquid separation chamber, rows of tubes connected to the chamber so as to have outlets in its gas space at different levels and discharging gas and liquid into the chamber, means connecting said tubes and the chamber into a fluid circulation system, and independent baffles fixed within the chamber between adjacent outlets in different rows and spaced from each other longitudinally of the chamber to maintain their discharges free from interference with each other, the water from each of said outlets and the steam from each of said outlets being free to separately and directly move to their respective supplies within the chamber, said baffles presenting steam guiding surfaces extending in a direction transversely of the chamber.

WILLIAM A. JONES.